United States Patent
Shin et al.

(10) Patent No.: US 12,042,776 B2
(45) Date of Patent: Jul. 23, 2024

(54) DISPERSION PLATE AND COATING DEVICE INCLUDING SAME

(71) Applicant: LG Chem, Ltd., Seoul (KR)

(72) Inventors: Hyun Jin Shin, Daejeon (KR); Jung Kee Jang, Daejeon (KR); Ye Hoon Im, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1037 days.

(21) Appl. No.: 16/963,654

(22) PCT Filed: Aug. 22, 2019

(86) PCT No.: PCT/KR2019/010676
§ 371 (c)(1),
(2) Date: Jul. 21, 2020

(87) PCT Pub. No.: WO2020/040559
PCT Pub. Date: Feb. 27, 2020

(65) Prior Publication Data
US 2021/0060513 A1    Mar. 4, 2021

(30) Foreign Application Priority Data
Aug. 24, 2018 (KR) .................. 10-2018-0099107

(51) Int. Cl.
*B01J 19/00* (2006.01)
*B01J 2/00* (2006.01)
(Continued)

(52) U.S. Cl.
CPC ............. *B01J 19/006* (2013.01); *B01J 2/006* (2013.01); *B01J 2/16* (2013.01); *B01J 8/44* (2013.01); *B01J 2219/00763* (2013.01)

(58) Field of Classification Search
CPC ....... B01J 2/00; B01J 2/006; B01J 2/16; B01J 8/00; B01J 8/18; B01J 8/24; B01J 8/44;
(Continued)

(56) References Cited

U.S. PATENT DOCUMENTS 5,328,720 A  7/1994 Emken et al.
5,891,401 A  4/1999 D'Acierno et al.
(Continued)

FOREIGN PATENT DOCUMENTS

CN  2351188 Y  12/1999
CN  2649171 Y  10/2004
(Continued)

OTHER PUBLICATIONS

Machine translation of KR 10-1384303 B1, which was published on Apr. 14, 2014 (Year: 2014).*
(Continued)

*Primary Examiner* — Natasha E Young
(74) *Attorney, Agent, or Firm* — Lerner David LLP (57) ABSTRACT

The present invention relates to a dispersion plate and a coating device comprising the same, which provides a dispersion plate comprising a plurality of gas injection holes, wherein the dispersion plate includes a plurality of spout nozzles formed by a dense arrangement of the gas injection holes, wherein one spout nozzle is disposed at the center of the dispersion plate and the plurality of spout nozzles are arranged along a plurality of virtual concentric circles from the center of the dispersion plate to the edge of the dispersion plate, where with respect to two adjacent virtual concentric circles, the number of spout nozzles arranged along an outer concentric circle based on the center of the dispersion plate is twice the number of spout nozzles arranged along an inner concentric circle and the arrangement interval of the spout nozzles arranged along the outer (Continued)

concentric circle is half the arrangement interval of the spout nozzles arranged along the inner concentric circle.

11 Claims, 5 Drawing Sheets

(51) Int. Cl.
    *B01J 2/16*     (2006.01)
    *B01J 8/44*     (2006.01)

(58) Field of Classification Search
    CPC ...... B01J 19/00; B01J 19/0053; B01J 19/006; B01J 19/24; B01J 2219/00; B01J 2219/00761; B01J 2219/00763; B01J 2219/24
    See application file for complete search history.

(56) References Cited

U.S. PATENT DOCUMENTS

| | | | |
|---|---|---|---|
| 6,247,657 | B1 | 6/2001 | Finney, Jr. et al. |
| 6,428,850 | B1 * | 8/2002 | Shinriki ............. C23C 16/4411 427/255.35 |
| 8,783,195 | B2 * | 7/2014 | Pakarinen .................. F23J 1/00 110/245 |
| 2003/0019580 | A1 | 1/2003 | Strang |
| 2004/0131791 | A1 | 7/2004 | Torben-Walter et al. |
| 2013/0221139 | A1 | 8/2013 | Pui et al. |
| 2013/0327712 | A1 | 12/2013 | DelGiacco et al. |
| 2015/0258565 | A1 | 9/2015 | Filicicchia et al. |

FOREIGN PATENT DOCUMENTS

| | | | |
|---|---|---|---|
| CN | 2708992 Y | 7/2005 | |
| CN | 101061988 A | 10/2007 | |
| CN | 104117472 A | 10/2014 | |
| CN | 204602474 U | 9/2015 | |
| CN | 207012954 U | 2/2018 | |
| JP | 2004097852 A | 4/2004 | |
| JP | 2015531315 A | 11/2015 | |
| KR | 20000040528 A | 7/2000 | |
| KR | 101134001 B1 | 4/2012 | |
| KR | 101149825 B1 | 5/2012 | |
| KR | 20130138126 A | 12/2013 | |
| KR | 10-1384303 B1 * | 4/2014 | ................ B01J 8/44 |

OTHER PUBLICATIONS

Extended European Search Report including Written Opinion for Application No. 19851149.5 dated Mar. 10, 2021, pp. 1-7.
Search Report for Chinese Application No. 201980007640.6 dated Oct. 20, 2021. 2 pgs.
Search Report for Chinese Application No. 201980007640.6 dated Mar. 3, 2021. 3 pgs.
International Search Report for Application No. PCT/KR2019/010676, mailed Nov. 29, 2019, pp. 1-2.

* cited by examiner

DISPERSION PLATE AND COATING DEVICE INCLUDING SAME

CROSS-REFERENCE TO RELATED APPLICATIONS

The present application is a national phase entry under 35 U.S.C. § 371 of International Application No. PCT/KR2019/010676, now WO 2020/040559, filed on Aug. 22, 2019, published in Korean, which claims priority to Korean Patent Application No. 10-2018-0099107, filed on Aug. 24, 2018, the disclosures of which are hereby incorporated herein by reference.

TECHNICAL FIELD

The present invention relates to a dispersion plate and a coating device comprising the same, and particularly, relates to a dispersion plate used in a fluidized bed coating device and a fluidized bed coating device comprising the same.

BACKGROUND ART

A fluidized bed coating device is a device that sprays gas from a dispersion plate to coat fluidized particles with a polymer solution or the like and dries them.

The dispersion plate is perforated with gas injection holes to prevent particle retention, and comprises spout nozzles disposed at certain portions of the dispersion plate. Relatively large holes are clustered in each spout nozzle.

Spout regions with a low particle ratio in a bed (meaning a bed of particles) are formed by the gas injection of the spout nozzles, and the coating of the particles is performed by a polymer droplet injection nozzle located therein. The coated particles are ejected to the top of the bed and then dried while descending.

In order to increase particle coating efficiency, the particle flow in the spout regions is smooth, so that there should be no coating interference phenomenon between particles.

When the existing dispersion plate is linearly scaled up upon device scale-up, the pitch (interval) of the gas injection holes is widened, so that there is a possibility of generating particle flow dead zones and there is a possibility of occurrence of a particle falling-out phenomenon by the widened holes. Therefore, the size of holes must be smaller than the size of particles to be produced.

If the device is scaled up, there is a need for an optimal arrangement of spout nozzles that can develop the spout regions well.

If the spout nozzle arrangement is loose, the particle coating regions interfere with each other, whereby there is a problem that the coating is uneven.

DISCLOSURE

Technical Problem

It is an object of the present invention to provide a dispersion plate which can ensure smooth particle coating performance even in scale-up devices through an optimal arrangement of spout nozzles, and a coating device comprising the same.

Technical Solution

In order to achieve the above-described object, the present invention provides a dispersion plate, comprising: a plurality of gas injection holes positioned in the dispersion plate such that a plurality of spout nozzles are formed by dense groupings of the gas injection holes, wherein one of the plurality of spout nozzles is disposed at a center of the dispersion plate, and other ones of the plurality of spout nozzles are arranged along a plurality of virtual concentric circles distributed from the center of the dispersion plate to a peripheral edge of the dispersion plate, and wherein with respect to two adjacent ones of the virtual concentric circles, a number of spout nozzles arranged along an outer concentric circle is twice a number of spout nozzles arranged along an inner concentric circle, and an arrangement interval of the spout nozzles arranged along the outer concentric circle is half of an arrangement interval of the spout nozzles arranged along the inner concentric circle.

In the present invention, a radial distance between respective ones of the virtual concentric circles may be the same, and a circumferential distance between respective ones of the spout nozzles disposed in a same one of the virtual concentric circles may be the same.

In the present invention, a diameter of each spout nozzle may be 2 to 20% of a diameter of the dispersion plate, and the radial distance between respective ones of the virtual concentric circles may be 5 to 40% of the diameter of the dispersion plate and 50 to 400% of the diameter of the spout nozzles.

In the present invention, opening ratios of the gas injection holes may be different within each region of the dispersion plate between the virtual concentric circles.

In the present invention, the opening ratio of a first region outside of an outermost concentric circle may be smaller than the opening ratio of a second region adjacent to the first region, the opening ratio of the first region may be smaller than the opening ratio of a third region inside of an innermost concentric circle, and the opening ratio of the second region may be greater than or equal to the opening ratio of the third region.

In the present invention, the opening ratio of the second region may be 2 to 5 times the opening ratio of the first region, the opening ratio of the third region may be 1.5 to 4 times the opening ratio of the first region, and the opening ratio of the second region may be 0.5 to 2 times the opening ratio of the third region.

In the present invention, the spout nozzles within each of the virtual concentric circles may have a different flow rate than the spout nozzles within other ones of the virtual concentric circles.

In addition, the present invention provides a coating device comprising a chamber; and the above-described dispersion plate installed inside the chamber.

The coating device according to the invention may further comprise structures disposed in a wind box portion of the chamber, the structures disposed beneath a bottom of the dispersion plate, the structures being configured to guide a gas flow within the chamber.

In the present invention, the structures may comprise: a first structure extending across a diameter of the chamber and having a hole at a center thereof, the hole being configured to induce the gas flow toward a center of the chamber; and a second structure disposed concentrically with the first structure and disposed above the first structure, the second structure extending across a central region of the chamber, a peripheral edge of the second structure being spaced apart from a wall of the chamber by a circumferential gap configured to induce the gas flow toward the wall of the chamber.

In the present invention, the first structure may be disposed in a tapered region of the chamber in which a diameter of the chamber decreases towards a bottom of the chamber, a diameter of the second structure may be 20 to 50% of the diameter of the chamber and 50 to 150% of a diameter of the hole of the first structure, and a radial distance between an inner edge of the first structure and the peripheral edge of the second structure may be 20 to 150% of the diameter of the second structure.

Advantageous Effects

According to the present invention, it is possible to ensure smooth particle coating performance even in a scale-up device through an optimal arrangement of spout nozzles.

MODE FOR INVENTION

Hereinafter, the present invention will be described in detail with reference to the accompanying drawings.

The coating device according to the present invention may be a fluidized bed coating device that sprays gas from a dispersion plate to coat fluidized particles with a coating liquid and dries them. The kind of particles is not particularly limited, which may be, for example, fertilizer particles. The size and the input of the particles are not particularly limited, which may be appropriately set. The kind of the coating liquid is not particularly limited, which may be, for example, a polymer solution. The injection velocity and the coating amount of the coating liquid are not particularly limited, which may be appropriately set. The kind of the gas is not specifically limited, and for example, air, hot air, etc. may be used. The flow velocity of the gas or the like is not particularly limited, which may be appropriately set. In addition, the dispersion plate according to the present invention is applicable to other fluidized bed reactors in addition to the coating device.

Figure 1:
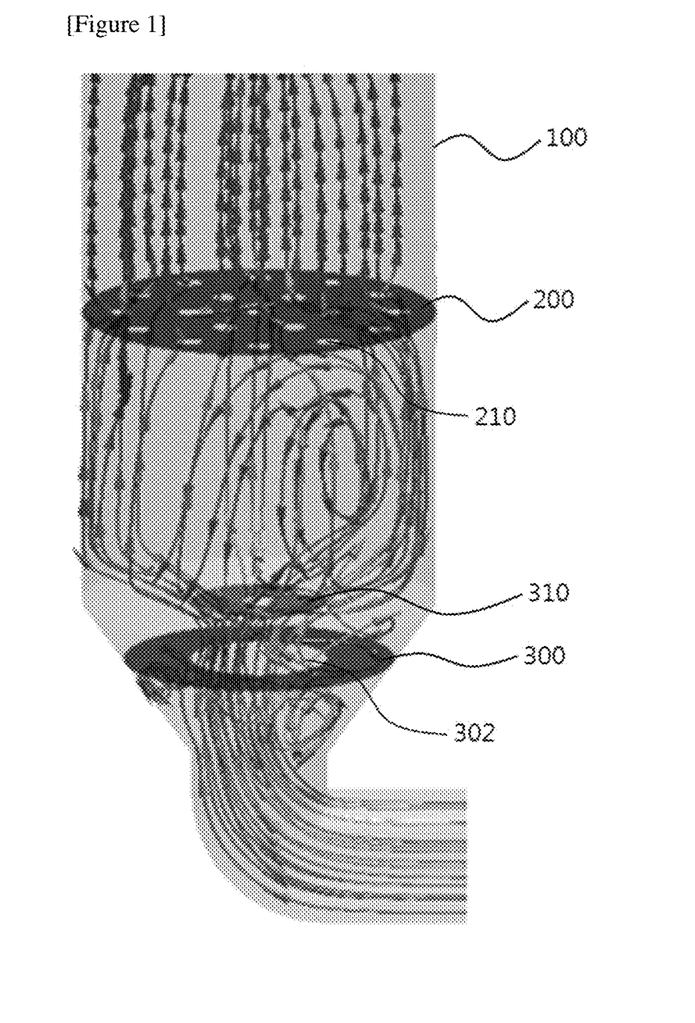
FIG. 1 is a configuration diagram of a coating device according to the present invention.

FIG. 1 is a configuration diagram of a coating device according to the present invention, where the coating device may be composed of a chamber (100), a dispersion plate (200), spout nozzles (210), wind box structures (300, 310) and the like.

The chamber (100) is a coating device body, which may be configured in a cylindrical shape or the like and may comprise a taper region, the diameter of which decreases downward, at the bottom. In addition, the chamber (100) may be equipped with a particle inlet through which particles to be coated are introduced, a particle outlet through which coated particles are discharged, a gas inlet through which gas is introduced, and a gas outlet through which gas is discharged. The size, material, etc. of the chamber (100) are not specifically limited, which may be appropriately set.

The dispersion plate (200) may be installed throughout the cross-section of the chamber (100) inside the chamber (100), for example, in the horizontal direction. When the chamber (100) is a cylindrical chamber, the dispersion plate (200) may be composed of a disc. In this case, the diameter of the dispersion plate (200) may be the same as the inner diameter of the chamber (100). The position and the number of the dispersion plates (200) in the chamber are not particularly limited, and for example, one or two or more dispersion plates may be disposed in the lower or middle region of the chamber (100). The diameter, thickness, material, and the like of the dispersion plate (200) are not particularly limited, which may be appropriately set. The dispersion plate (200) may be mounted or fixed to the chamber (100) by a supporting member, screwing, welding or the like.

Figure 2:
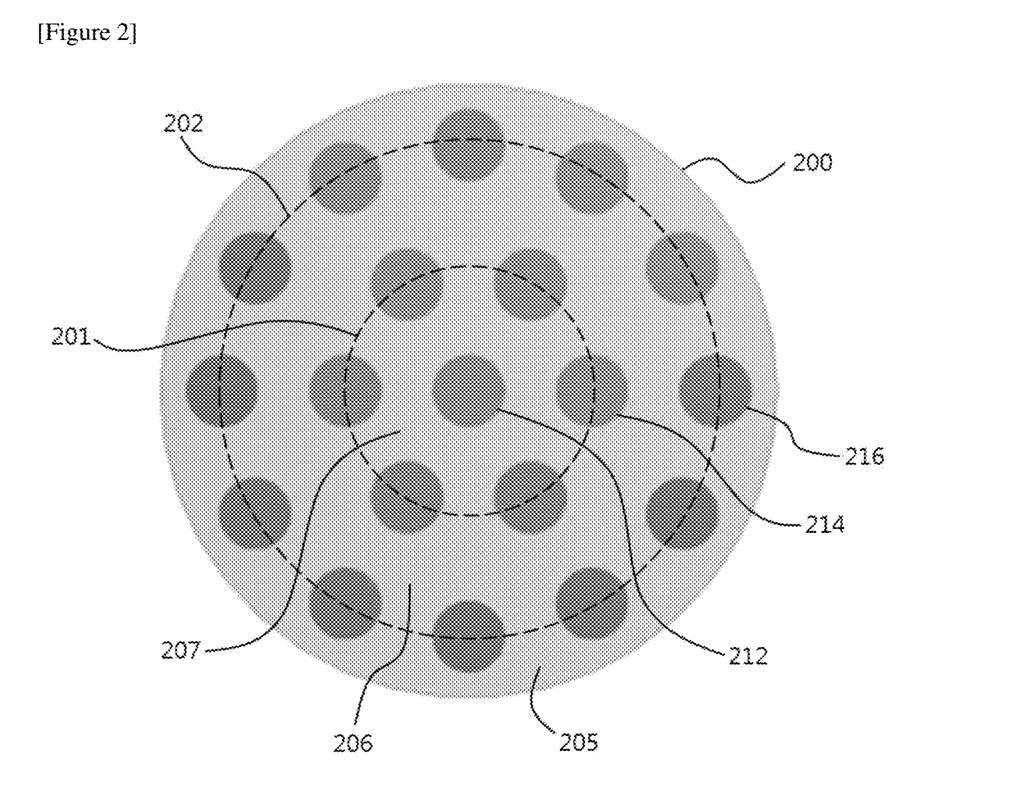
FIG. 2 is a configuration diagram of a dispersion plate according to the present invention.

The dispersion plate (200) comprises a plurality of gas injection holes over the entire region of the dispersion plate (200). The dispersion plate (200) includes a plurality of spout nozzles (210) formed by a dense arrangement of the gas injection holes. Since the size of the gas injection holes is very fine and the number is also very large, they have been not separately shown or indicated in the drawings. The gas injection holes are also formed in an inner region of the spout nozzles (210) (a dispersion plate region in which the spout nozzles are formed, a spout nozzle region), and are also formed in an outer region of the spout nozzles (210) (the other region of the dispersion plate except the spout nozzles), where the gas injection holes formed in the inner region of the spout nozzles (210) are concentrated at a denser interval than the gas injection holes formed in the outer region of the spout nozzles (210). That is, the spout nozzle (210) may mean a region of the dispersion plate (200) that may be visually distinguished from the other region of the dispersion plate (200) except for the spout nozzle (210) due to the difference in the density of the gas injection holes. Specifically, the spout nozzle (210) may mean a region of the dispersion plate (200) in which the density of the gas injection holes is higher than that of the other region of the dispersion plate (200) except for the spout nozzle (210). The difference in density between two regions (inner region and outer region of spout nozzle) is not particularly limited, which may be appropriately set.

The gas injection holes may be formed through the dispersion plate (200) in the thickness direction of the dispersion plate (200), and the gas is introduced from the bottom of the dispersion plate (200) and then injected above the dispersion plate (200) while passing through a number of gas injection holes. The diameter, number and interval of the gas injection holes are not particularly limited, which may be appropriately set, but the diameter of the gas injection holes should be smaller than the particle diameter. The diameter of the gas injection holes formed in the inner region of the spout nozzle (210) is preferably larger than the diameter of the gas injection holes formed in the outer region of the spout nozzle (210), but may also be the same or smaller.

FIG. 2 is a configuration diagram of a dispersion plate according to the present invention, which illustrates the optimum arrangement of the spout nozzles. In the device scale-up, the number of the gas injection holes has been increased by the increased area of the dispersion plate while maintaining their original size, in order to suppress the occurrence of flow dead zones. In addition, the optimum arrangement of the spout nozzles capable of covering the increased area has been made. As a result of the optimal arrangement of the spout nozzles, the concentric circle arrangement has been found to be the best.

The concentric circle arrangement may mean that if a plurality of (at least two or more) virtual circles is assumed, the center of each virtual circle is the same as the center of the dispersion plate, the diameter of each virtual circle increases from the inside to the outside, and a plurality of spout nozzles are disposed along the circumference of the relevant virtual circle, but the center of each spout nozzle is positioned at the circumference of the virtual circle.

Specifically, as shown in FIG. 2, the optimal arrangement of the spout nozzles is a concentric circle arrangement, which is characterized in that one spout nozzle (212) is disposed at the center of the dispersion plate (200), and a plurality of spout nozzles (214, 216) are disposed along a plurality of virtual concentric circles (201, 202) from the center of the dispersion plate (200) to the edge of the dispersion plate (200), where with respect to two adjacent virtual concentric circles (201, 202), the number of the spout nozzles (216) disposed along an outer concentric circle (202) based on the center of the dispersion plate (200) is twice the number of the spout nozzles (214) disposed along an inner concentric circle (201) and the arrangement interval of the spout nozzles (216) disposed along the outer concentric circle (202) is half (that is, ½ or 0.5 times) of the arrangement interval of the spout nozzles (214) disposed along the inner concentric circle (201).

In FIG. 2, one spout nozzle (212) is disposed at the center of the dispersion plate (200), 6 spout nozzles (214) are disposed at intervals of 60 degrees in the first concentric circle (201) near the center of the dispersion plate (200), and 12 spout nozzles (216) are disposed at intervals of 30 degrees in the second concentric circle (202) positioned outside the first concentric circle (201) and having a larger diameter than that of the first concentric circle (201).

As such, in the concentric circle arrangement, one spout nozzle (212) is located at the center, 6 spout nozzles (214) are located at intervals of 60 degrees in the next concentric circle (201), and then 12 spout nozzles (216) are located at intervals of 30 degrees in the next concentric circle (202). As the dispersion plate (200) grows larger, the spout nozzle arrangement begins from one at the center and extends to larger concentric circles. At this time, the spout nozzles (216) of the outer concentric circle (202) have a characteristic that they are disposed so that the angle is half and the number is doubled, as compared with the arrangement of the spout nozzles (214) of the inner concentric circle (201).

When such a concentrically extending spout nozzle arrangement is applied, the particle coating may be smooth by maintaining the independence of each spout region, and it may be advantageous to suppress an agglomeration phenomenon by particle surface stickiness due to the development of the dry region on the particle bed.

Although only two concentric circles have been illustrated in FIG. 2, the arrangement of more concentric circles such as a third concentric circle and a fourth concentric circle may be performed according to the sizes of the chamber (100) and the dispersion plate (200). For example, in the case of the third concentric circle, 24 spout nozzles may be disposed at intervals of 15 degrees. In addition, in the first concentric circle (201), the number of spout nozzles (214) may start with 2 to 5, which is less than 6, or may also start with 7 or more, which is more than 6, or the like, instead of 6.

The respective concentric circles (201, 202) are arranged concentrically while sharing the center of the dispersion plate (200). The interval between the respective concentric circles (201, 202), that is, the radius difference between the respective concentric circles (201, 202) is preferably the same for the respective concentric circles (201, 202), but may also be different. Also, the interval between the respective spout nozzles (214, 216) disposed in the same concentric circles (201, 202) is preferably the same, but may also be different.

The diameters of the respective spout nozzles (212, 214, and 216) are not particularly limited, which may each independently be, for example, 2 to 20%, 5 to 15% or 8 to 12% relative to the diameter of the dispersion plate (200).

The interval between the respective concentric circles (201, 202) is not particularly limited, which may each independently be, for example, 5 to 40%, 10 to 30% or 15 to 25% relative to the diameter of the dispersion plate (200). In addition, the interval between the respective concentric circles (201, 202) may each independently be, for example, 50 to 400% (that is, 0.5 to 4 times), 100 to 300% (that is, 1 to 3 times) or 150 to 250% (that is, 1.5 to 2.5 times), relative to the diameter of the spout nozzles (212, 214, and 216).

The spout nozzles (212, 214, and 216) may be provided with atomizers in the form of holes or nozzles capable of spraying the coating liquid. One atomizer may be formed in the center of the spout nozzle, and a plurality of atomizers may also be formed in the center region. The diameter of the atomizer is preferably larger than the diameter of the gas injection hole, but is not limited thereto. In addition, one or more gas injection holes formed inside the spout nozzle may also be used as atomizers. The coating liquid may be moved and sprayed through a carrier gas (air, etc.).

Figure 3:
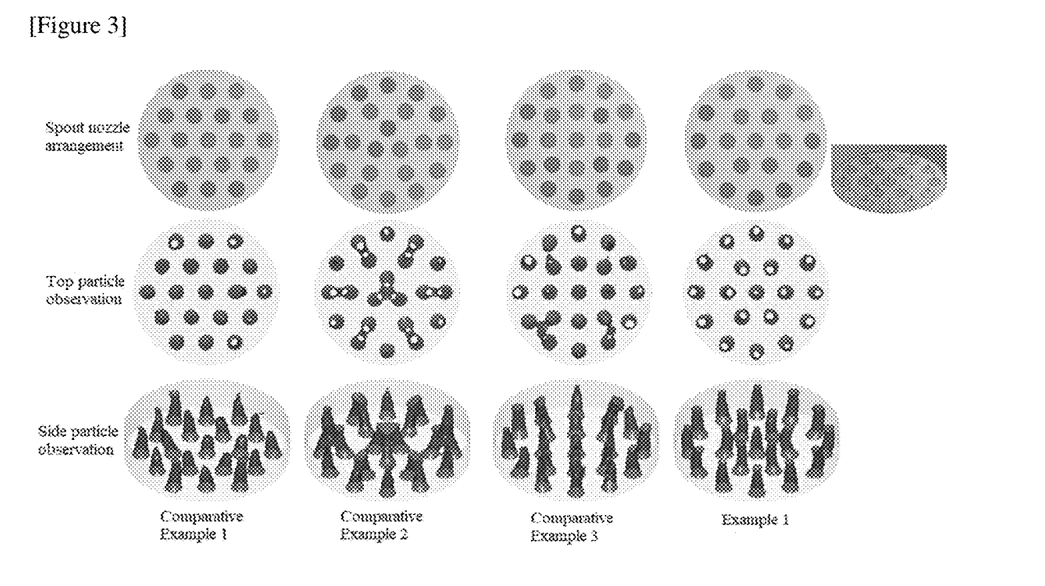
FIG. 3 compares particle observations for each spout nozzle arrangement.

FIG. 3 compares particle observations for each spout nozzle arrangement, which is based on a particle volume ratio of 0.3. Referring to the upper drawings of FIG. 3, in the case of Comparative Example 1, 19 spout nozzles, which are the same as in Example 1, are disposed, and one spout nozzle is disposed at the center of the dispersion plate, but the outermost spout nozzles are not disposed on the concentric circle.

In the case of Comparative Example 2, 21 spout nozzles, which are two more than Example 1, are disposed, and the whole makes the concentric circle arrangement, but there is no spout nozzle in the center of the dispersion plate.

In the case of Comparative Example 3, 21 spout nozzles are disposed, and one spout nozzle is disposed at the center of the dispersion plate, but the spout nozzles of the second line at the outermost side are not disposed on the concentric circle.

The middle drawings of FIG. 3 show particle distributions observed from above and the lower drawings of FIG. 3 show particle distributions observed from the side. Unlike Comparative Examples, it can be confirmed from Example 1 that the spout regions have been well developed due to the optimal arrangement of the spout nozzles, and the particle flow is smooth in the spout regions, so that there is no coating interference phenomenon, whereby the particle coating efficiency can be increased.

Figure 4:
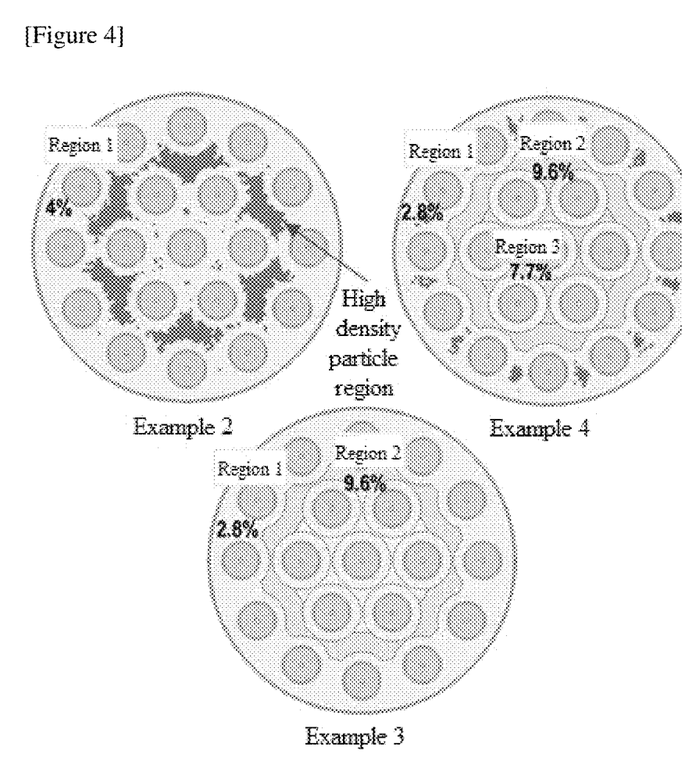
FIG. 4 compares particle distribution effects according to opening ratio change for each dispersion plate region.

Referring to FIGS. 2 and 4, the opening ratios of the gas injection holes may be different for each region (205, 206, and 207) between the respective concentric circles (201, 202) except for the spout nozzles (212, 214, and 216). The opening ratio may mean a ratio of the area (total area of the gas injection holes) occupied by a number of gas injection holes formed in the relevant regions based on the total area of the relevant regions including the gas injection holes. At this time, the areas of the spout nozzles (212, 214, and 216) may be excluded from the calculation.

Specifically, the opening ratio of a first region (205) corresponding to the outer side of the outermost concentric circle (202) may be smaller than the opening ratio of a second region (206) adjacent to the first region (205), and the opening ratio of the first region (205) may be smaller than the opening ratio of a third region (207) corresponding to the inside of the innermost concentric circle (201). That is, the opening ratio of the first region (205) may be the smallest. In addition, the opening ratio of the second region (206) may be greater than or equal to the opening ratio of the third region (207).

In setting the opening ratios differently for each region, the number of gas injection holes may be set differently, or the number may be set the same, but the diameter of the gas injection holes may be set differently. That is, the opening ratio may be adjusted by adjusting the number and/or the diameter of the gas injection holes.

More specifically, for example, the opening ratio of the second region (206) may be 2 to 5 times or 3 to 4 times the opening ratio of the first region (205), and the opening ratio of the third region (207) may be 1.5 to 4 times or 2 to 3 times the opening ratio of the first region (205), and the opening ratio of the second region (206) may be 0.5 to 2 times or 1 to 1.5 times the opening ratio of the third region (207), without being limited thereto.

FIG. 4 compares particle distribution effects according to opening ratio change for each dispersion plate region, where the region with the greater distance between the spout nozzles can be perforated more largely, thereby suppressing particle aggregation there and improving retention of the particles in the dispersion plate. Of course, the size of the perforations should not exceed the particle size.

In the case of Example 2, the whole dispersion plate was comprised of one region (first region) without region division, and the opening ratio of the first region was 4%. In the case of Example 2, there was no region division, so that high density particle regions were formed between the first concentric circle and the second concentric circle.

In the case of Example 3, the outermost region was set as the first region and all the inside thereof was set as the second region, where the opening ratio of the first region was 2.8% and the opening ratio of the second region was set to 9.6%, which was about 3.42 times that of the first region.

In the case of Example 4, the outermost region was set as the first region and the inside thereof was sequentially set as the second region and the third region, where the opening ratio of the first region was 2.8%, the opening ratio of the second region was 9.6%, which was about 3.42 times that of the first region and the opening ratio of the third area was set to 7.7%, which was 2.75 times that of the first region. In addition, the opening ratio of the second region was about 1.25 times that of the third region.

Compared with Example 2, in Examples 3 and 4, the high density particle region was not present or reduced.

On the other hand, the flow rates of the spout nozzles may be different for each concentric circle. As such, the independence of the spout regions can be further secured by adjusting the flow rates of the concentric inner and outer spout nozzles.

Figure 5:
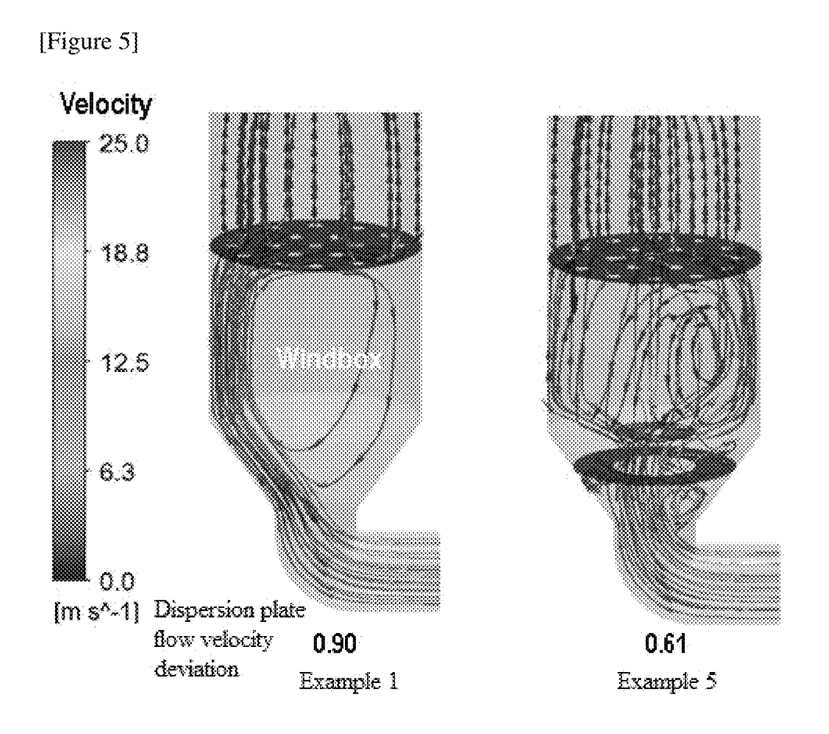
FIG. 5 compares flow velocity deviation effects according to installation of wind box structures.

Referring to FIGS. 1 and 5, the coating device according to the present invention may further comprise structures (300, 310) which are disposed in the wind box (dispersion plate bottom space) formed in the bottom of the dispersion plate (200) to guide the gas flow.

The structures (300, 310) may comprise a first structure (300) which is formed throughout the diameter direction of the chamber (100) and equipped with a hole (302) in the center to induce the gas flow toward the center of the chamber (100); and a second structure (310) which is disposed concentrically with the first structure (300) on the top of the first structure (300) and partially formed except for a portion adjacent to a chamber wall of the chamber (100) with respect to the diameter direction of the chamber (100) to induce the gas flow toward the wall of the chamber (100).

The structures (300, 310) may be installed inside the chamber (100), for example, in a horizontal direction (cross-sectional direction). The first structure (300) may be installed over the entire cross-section of the chamber (100), and the second structure (310) may be partially installed to be spaced apart from the inner wall of the chamber (100). The structures (300, 310) may each be formed of a disc, and the diameter of the first structure (300) may be the same as the inner diameter of the chamber (100). The structures (300, 310) may be composed of three or more. The thickness and the material of the structures (300, 310) are not particularly limited, which may be appropriately set.

The first structure (300) may be mounted or fixed to the chamber (100) by a supporting member, screwing, welding or the like. The second structure (310) may be mounted or fixed to be spaced apart from the inner wall of the chamber (100) by a supporting member, a connecting member or the like. The first structure (300) may be disposed in the taper region where the diameter of the chamber (100) decreases downward, but is not limited thereto. The second structure (310) may be disposed in the boundary region between the uniform diameter region and the taper region of the chamber (100), but is not limited thereto.

The diameter of the first structure (300) may be greater than or equal to the diameter of the second structure (310). The diameter of the second structure (310) is not particularly limited, which may be, for example, 20 to 50%, 25 to 45% or 30 to 40% relative to the diameter of the chamber (100). In addition, the diameter of the second structure (310) may be 50 to 150%, 70 to 130% or 90 to 110% relative to the diameter of the hole (302) of the first structure (300). The interval between the first structure (300) and the second structure (310) is not particularly limited, which may be, for example, 20 to 150%, 50 to 120% or 70 to 100% relative to the diameter of the second structure (310).

The hole (302) of the first structure (300) may be formed through the first structure (300) in the thickness direction of the first structure (300) in the central region of the first structure (300). The hole (302) may be formed in a circular shape and may be formed concentrically with the center of the first structure (300). One or a plurality of holes (302) may be formed in the central region. The diameter of the hole (302) is not particularly limited, which may be, for example, 20 to 80%, 30 to 70% or 40 to 60% relative to the diameter of the first structure (300).

A hole may also be formed in the second structure (310). When there is a hole in the second structure (310), the gas flow may be induced not only toward the inner wall of the chamber (100) but also toward the center of the chamber (100). The position, shape, number, diameter, and the like of the hole are not particularly limited, which may be appropriately set.

FIG. 5 compares flow velocity deviation effects according to installation of wind box structures (maximum gas velocity 25 m/s), where by changing the wind box structure under the coating device, the pressure drop is not large and it is possible to reduce the flow velocity deviation (dispersion plate flow velocity deviation) of the gas (air, etc.) introduced into the dispersion plate. The flow velocity deviation may be a deviation from the average flow velocity obtained after measuring flow velocities of a number of localized regions over the entire region of the dispersion plate. The flow velocity can be measured directly using a sensor or the like, or obtained by computer simulation.

Referring to FIG. 5, in the case of Example 1 without any wind box structure, the gas flow was deflected toward one side (left) inner wall of the chamber in the wind box region below the dispersion plate, whereby the dispersion plate flow velocity deviation was large as 0.90. Accordingly, the gas flow was uneven even on the top of the dispersion plate.

However, in the case of Example 5 with the wind box structures, the gas flow in the first structure was induced toward the center of the chamber and then evenly dispersed throughout the entire region of the chamber as it struck the second structure, whereby the flow velocity deviation was significantly reduced as 0.61. Accordingly, the gas flow was uniform even on the top of the dispersion plate.

EXPLANATION OF REFERENCE NUMERALS

100: chamber
200: dispersion plate
201: first concentric circle
202: second concentric circle
205: first region
206: second region
207: third region
210, 212, 214, 216: spout nozzle
300: first structure
302: first structure hole
310: second structure

The invention claimed is:

1. A dispersion plate, comprising:

a plurality of gas injection holes over an entire region of the dispersion plate, the plurality of gas injection holes positioned in the dispersion plate such that a plurality of spout nozzles are formed by dense groupings of the gas injection holes, wherein the spout nozzles are regions of the dispersion plate in which a density of the gas injection holes is higher than a density of the gas injection holes in a remaining region of the dispersion plate outside of the spout nozzles, wherein one of the plurality of spout nozzles is disposed at a center of the dispersion plate, and other ones of the plurality of spout nozzles are arranged along a plurality of virtual concentric circles distributed from the center of the dispersion plate to a peripheral edge of the dispersion plate, and wherein with respect to two adjacent ones of the virtual concentric circles, a number of spout nozzles arranged along an outer concentric circle is twice a number of spout nozzles arranged along an inner concentric circle, and an arrangement interval of the spout nozzles arranged along the outer concentric circle is half of an arrangement interval of the spout nozzles arranged along the inner concentric circle.

2. The dispersion plate according to claim 1, wherein a radial distance between respective ones of the virtual concentric circles is the same, and a circumferential distance between respective ones of the spout nozzles disposed in a same one of the virtual concentric circles is the same.

3. The dispersion plate according to claim 1, wherein a diameter of each spout nozzle is 2 to 20% of a diameter of the dispersion plate, and the radial distance between respective ones of the virtual concentric circles is 5 to 40% of the diameter of the dispersion plate and 50 to 400% of the diameter of the spout nozzles.

4. The dispersion plate according to claim 1, wherein opening ratios of the gas injection holes are different within each region of the dispersion plate between the virtual concentric circles.

5. The dispersion plate according to claim 4, wherein the opening ratio of a first region outside of an outermost concentric circle is smaller than the opening ratio of a second region adjacent to the first region, the opening ratio of the first region is smaller than the opening ratio of a third region inside of an innermost concentric circle, and the opening ratio of the second region is greater than or equal to the opening ratio of the third region.

6. The dispersion plate according to claim 5, wherein the opening ratio of the second region is 2 to 5 times the opening ratio of the first region, the opening ratio of the third region is 1.5 to 4 times the opening ratio of the first region, and the opening ratio of the second region is 0.5 to 2 times the opening ratio of the third region.

7. The dispersion plate according to claim 1, wherein the spout nozzles within each of the virtual concentric circles have a different flow rate than the spout nozzles within other ones of the virtual concentric circles.

8. A coating device comprising a chamber and the dispersion plate according to claim 1 installed inside the chamber.

9. The coating device according to claim 8, further comprising structures disposed in a wind box portion of the chamber, the structures disposed beneath a bottom of the dispersion plate, the structures being configured to guide a gas flow within the chamber.

10. The coating device according to claim 9, wherein the structures comprise:

a first structure extending across a diameter of the chamber and having a hole at a center thereof, the hole being configured to induce the gas flow toward a center of the chamber; and a second structure disposed concentrically with the first structure and disposed above the first structure, the second structure extending across a central region of the chamber, a peripheral edge of the second structure being spaced apart from a wall of the chamber by a circumferential gap configured to induce the gas flow toward the wall of the chamber.

11. The coating device according to claim 10, wherein the first structure is disposed in a tapered region of the chamber in which a diameter of the chamber decreases towards a bottom of the chamber, a diameter of the second structure is 20 to 50% of the diameter of the chamber and 50 to 150% of a diameter of the hole of the first structure, and a radial distance between an inner edge of the first structure and the peripheral edge of the second structure is 20 to 150% of the diameter of the second structure.

* * * * *